UNITED STATES PATENT OFFICE 2,678,318

PREPARATION OF α-AMINO ACIDS

Ian Morris Heilbron, London, and Arthur Herbert Cook, Epsom, England, assignors to Beecham Research Laboratories Limited, Betchworth, England, a company of Great Britain No Drawing. Application August 19, 1949, Serial No. 111,327

12 Claims. (Cl. 260—309)

The present invention concerns the manufacture of α-amino acids of the general Formula i where $R_1$ and $R_2$ represent hydrogen, alkyl, aryl or

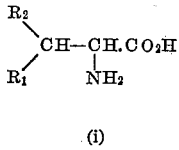 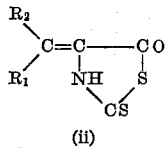

(i)  (ii)

aralkyl groups, or similar groups containing heterocyclic groupings $R_1$ and $R_2$ may be the same, or members of a carbocyclic or heterocyclic ring structure, or different, and may contain one or more of a variety of functional groups.

The invention provides a process for the manufacture of the aforesaid amino acids of the general Formula i from an intermediate compound of the general Formula ii, which is itself prepared from compounds represented by Formulae iii and iv, $R_1$ and $R_2$ having the same significance in all cases as has been already defined.

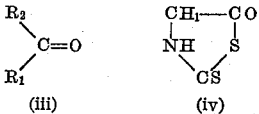 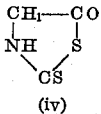

(iii)  (iv)

The process, according to the invention, for the preparation of an α-amino acid intermediate of the general Formula ii, comprises the condensation of a carbonyl compound of the general Formula iii or its equivalent with 2-thio-5-thiazolone of the Formula iv. By "the equivalent" of a compound of the general Formula iii we mean a similar compound, e. g. an acetal or ketal, in which there is linked to the carbon atom, besides $R_1$ and $R_2$, one or more reactive atoms or groups which will react with the hydrogen atoms in the 4-position of Formula iv thus causing the double bond linkage of Formula ii to be formed. The condensation may be effected in the presence of an acidic or basic substance as catalyst and in a solvent, which is either an excess of the carbonyl compound or a medium which is inert in respect to the reaction.

The catalyst may be organic or inorganic and examples of suitable condensation media are acetic acid containing substantially anhydrous hydrogen chloride, morpholine or piperidine. Alternatively, in the case of the carbonyl compound possessing acidic or basic properties, it will itself act as catalyst and a separate catalyst may be excluded.

The present invention further provides a process for the manufacture of the aforesaid amino acids by reducing the compounds of the general Formula ii in an acid medium using an acid reducing agent. A mixture of phosphorus and hydrogen iodide is preferred as the reducing agent, but the process may if desired be carried out with other acid reducing agents such as a mixture of zinc and acetic acid.

The following examples illustrate how the processes of the invention may be carried into effect:

Example 1

2-thio-5-thiazolone (iv) (10 g.) was dissolved in warm acetone (200 cc.) and morpholine (2 drops) added. After six days at room temperature the crystalline deposit was removed and a further crop obtained by diluting the mother-liquor with water. After recrystallisation from a mixture of acetone and water 4-isopropylidene-2-thio-5-thiazolone (yield, 9 g. or 77%) formed pale yellow needles, M. P. 211°.

Alternatively, this compound might have been obtained with an acid catalyst as follows:

2-thio-5-thiazolone (10 g.) in acetic acid (100 cc.) was treated with dry acetone (20 cc.). After 12 hours part of the product had crystallised, and more was precipitated from the filtrate by adding water. The combined product was washed thoroughly with 2 N aqueous sodium hydrogen carbonate and the residue crystallised from dilute acetic acid. The 4-isopropylidine compound (3 g.), separated in needles, M. P. 211-212.

A solution of the preceding compound (3 g.) in acetic acid (20 cc.) was refluxed with red phosphorus (5 g.) and 40% aq. hydrogen iodide (10 g.) for 1.5 hours. The filtrate was diluted with water, a small amount of a gum decanted, and the clear liquid evaporated in vacuo to dryness. The residue was dissolved in hot water (5 cc.) and, after adding a small quantity of charcoal, filtered. On adding pyridine (5 cc.) to the filtrate, valine, M. P. 298° (yield, 1.6 g.) separated and was identified with an authentic specimen.

Example 2

2-thio-5-thiazolone (1 g.) was treated with acetic acid (10 cc.) and isobutyraldehyde (2 g.). Piperidine (1 drop) was added and the solution kept for 12 hours at room temperature. On diluting with water 4-isobutylidene-2-thio-5-thiazolone separated and was recrystallised from dilute acetic acid. It had M. P. 122° (yield 1.3 g.).

The preceding compound (2.4 g.) was refluxed for 1.5 hours with acetic acid (20 cc.), red phosphorus (3.5 g.) and 40% hydrogen iodide (10 g.). The filtrate was evaporated in vacuum to a syrup, water (5 cc.) was added with a little charcoal, and the solution filtered. Addition of cold ethanol (50 cc.) and a small quantity of pyridine caused the product (1.3 g. or 77%) to crystallise. It formed thin lustrous plates (M. P. 295°) and was identical with leucine.

Example 3

2-thio-5-thiazolone (20 g.) was dissolved in hot acetic acid (200 cc.) and benzaldehyde (21 g.) was added together with morpholine (0.2 cc.). The mixture was kept at room temperature for a few hours and the crystalline deposit removed. Further crops were obtained on diluting the filtrate with water and allowing to stand. 4-benzylidine-2-thio-5-thiazolone (yield, 31 g.) could be recrystallised from acetic acid when it formed yellow crystals, M. P. 212–214°.

Alternatively, this compound might have been obtained with an acid catalyst as follows:

2-thio-5-thiazolone (10 g.) was warmed with saturated ethanolic hydrogen chloride (10 cc.) containing benzaldehyde (2.0 g.). The white solid dissolved and was quickly replaced by a mass of yellow crystals of the 4-benzylidene compound, M. P. 212–214° (yield, 60% of theory), identical with that obtained in presence of bases.

2-thio-5-thiazolone (24 g.) was dissolved in acetic acid (250 cc.) containing benzaldehyde (50 g.) and a moderate stream of hydrogen chloride passed through the solution for 30 minutes. After keeping the solution overnight the 4-benzylidene compound (35 g. or 88% of theory), M. P. 212–214°, was collected.

The preceding compound (3 g.) was refluxed for 1.5 hours with acetic acid (20 cc.) red phosphorus (4 g.) and 40% aq. hydrogen iodide (10 cc.). The filtrate was evaporated to dryness in vacuum and the residue dissolved in hot water and decolorized with charcoal. The filtrate (15 cc.) was treated with pyridine (10 cc.) when large colourless pearly plates of phenylalanine (yield, 70%), M. P. 262–264° were obtained.

Example 4

2-thio-5-thiazolone (10 g.) was treated with hot acetic acid (100 cc.), p-hydroxybenzaldehyde (11 g.) and piperidine (0.2 cc.); after standing overnight at room temperature the yellow needles were filtered and a further crop obtained by diluting the filtrate with water. 4-p-hydroxybenzylidene-2-thio-5-thiazolone crystallised as yellow needles M. P. 199–200°.

The above compound (3 g.) was suspended in glacial acetic acid (25 cc.) and refluxed for 1.5 hours with 40% aq. hydrogen-iodide (10 g.) and red phosphorus (4 g.). The filtrate was evaporated to dryness in vacuum the residue taken up in 50% aq. pyridine (20 cc.) and the solution allowed to cool. Tyrosine (yield, 1.7 g.) M. P. 290–295° separated and was identified as its ester hydrochloride.

Example 5

2-thio-5-thiazolone (2 g.) in acetic acid (10 cc.) and cyclohexanone (4 cc.) was treated with piperidine (1 drop). On standing for 12 hours at room temperature 4-cyclohexylidene-2-thio-5-thiazolone (yield 0.7 g.) M. P. 225° separated.

The preceding compound (2 g.) was reduced by refluxing for 2 hours with glacial acetic acid (10 g.). The filtrate was evaporated to dryness in vacuum, the residue dissolved in the minimum of hot water and the amino acid precipitated by adding dilute aq. ammonia. Cyclohexylglycine was precipitated and could be recrystallised from glacial acetic acid when it had M. P. 295–297°.

Example 6

2-thio-5-thiazolone (4 g.) was dissolved in boiling acetic acid (15 cc.) and β:β-diethoxyethyl methyl sulphide (5.2 g.) was added followed by piperidine (0.1 cc.) and the solution kept for 2 hours at room temperature. 4-β-S-methylidene-2-thio-5-thiazolone (5.5 g.) separated and could be recrystallised from acetic acid in pale yellow plates M. P. 158°.

The above compound (2 g.) was reduced by refluxing for 20 minutes with acetic acid (15 cc.) red phosphorus (2 g.) and 40% hydrogen iodide (5 g.). The filtrate was concentrated to dryness in vacuum, the residue taken up in hot water, and the solution decolorized and the filtrate (10 cc.) treated with pyridine (3 cc.). On cooling methionine crystallised in colourless needles M. P. 275–280°, identical with an authentic specimen.

Example 7

4-imidazolylaldehyde (Pyman, J., 1916, I, 186) (2.6 g.) was dissolved together with 2-thio-5-thiazolone (2.3 g.) in acetic acid (20 cc.) with warming. In this instance the aldehyde is itself basic and no additional catalyst is required. An exothermic reaction set in at the boiling point and after allowing to cool the crystalline deposit was filtered. The product (3.75 g.) was almost pure but could be recrystallised from acetic acid when 4:4'-imidazolidene-2-thio-5-thiazolone separated in yellow-green prisms, M. P. 260°.

The preceding compound (1.5 g.) was refluxed with a mixture of 40% aq. hydrogen iodide (2.25 cc.), acetic acid (20 cc.) and acetic anhydride (5 cc.) containing red phosphorus (1.5 g.) for 1.5 hours. The filtrate was evaporated to dryness in vacuum and the gummy residue extracted with hot water (2×3 cc.) charcoal being added; the clear solution was made just alkaline with ammonia and again evaporated to dryness. The residue was extracted with ether and the remainder taken up in water (5 cc.) and treated with picric acid (1 g.) in aqueous solution. Histidine picrate (1.5 g.), M. P. 187–188°, was collected, and was converted into histidine dihydrochloride, M. P. 234–233°, identified with an authentic specimen.

We claim:

1. Process for the preparation of an α-amino acid of the general formula

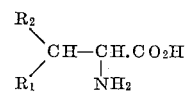

where $R_1$ and $R_2$ are selected from the group consisting of hydrogen, alkyl, aryl, and aralkyl radicals, and cyclo alkyl radicals and 4-imidazolyl in which $R_1$ and $R_2$ are members of the ring, and any of said radicals containing at least one functional group in which process a compound of the general formula

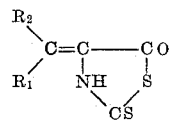

in which $R_1$ and $R_2$ have the meaning set forth above, is reduced in a hot acid medium using an acid reducing agent.

2. Process as set forth in claim 1 in which the reducing agent is a mixture of phosphorus and hydrogen iodide.

3. Process as set forth in claim 1 in which the reducing agent is a mixture of zinc and acetic acid.

4. Process for the preparation of an α-amino acid of the general formula

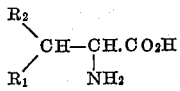

where $R_1$ and $R_2$ are selected from the group consisting of hydrogen, alkyl, aryl, and aralkyl radicals, and cyclo alkyl radicals and 4-imidazolyl in which $R_1$ and $R_2$ are members of the ring, and any of said radicals containing at least one functional group, in which process a compound of the general formula

where $R_1$ and $R_2$ have the meaning set forth above and X represents at least one reactive radical which will react with the hydrogen atoms in the 4-position of 2-thio-5-thiazolone, is condensed with 2-thio 5-thiazolone to produce a compound of the general formula

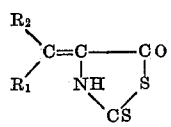

where $R_1$ and $R_2$ have the meaning set forth above, which last mentioned compound is then reduced in a hot acid medium using an acid reducing agent.

5. Process for the preparation of an α-amino acid of the general formula

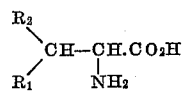

where $R_1$ and $R_2$ are selected from the group consisting of hydrogen, alkyl, aryl, and aralkyl radicals, and cyclo alkyl radicals and 4-imidazolyl in which $R_1$ and $R_2$ are members of the ring, and any of said radicals containing at least one functional group, in which process a compound of the general formula

where $R_1$ and $R_2$ have the meaning set forth above and X represents at least one reactive radical which will react with the hydrogen atoms in the 4-position of 2-thio-5-thiazolone, is condensed with 2-thio-5-thiazolone in the presence of an acidic substance to produce a compound of the general formula

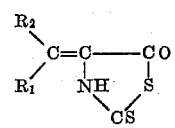

where $R_1$ and $R_2$ have the meaning set forth above, which last mentioned compound is then reduced in a hot acid medium using an acid reducing agent.

6. Process as set forth in claim 5 in which the acidic substance is acetic acid containing substantially anhydrous hydrogen chloride.

7. Process for the preparation of an α-amino acid of the general formula

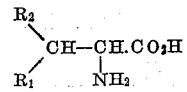

where $R_1$ and $R_2$ are selected from the group consisting of hydrogen, alkyl, aryl, and aralkyl radicals, and cyclo alkyl radicals and 4-imidazolyl in which $R_1$ and $R_2$ are members of the ring, and any of said radicals containing at least one functional group, in which process a compound of the general formula

where $R_1$ and $R_2$ have the meaning set forth above and X represents at least one reactive radical which will react with the hydrogen atoms in the 4-position of 2-thio-5-thiazolone, is condensed with 2-thio-5-thiazolone in the presence of a basic substance to produce a compound of the general formula

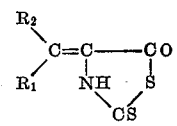

where $R_1$ and $R_2$ have the meaning set forth above which last mentioned compound is then reduced in a hot acid medium using an acid reducing agent.

8. Process as set forth in claim 7 in which the basic substance is one selected from the group consisting of morpholine and piperidine.

9. Process for the preparation of an α-amino acid of the general formula

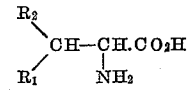

where $R_1$ and $R_2$ are selected from the group consisting of hydrogen, alkyl, aryl, and aralkyl radicals, and cyclo alkyl radicals and 4-imidazolyl in which $R_1$ and $R_2$ are members of the ring, and any of said radicals containing at least one functional group, in which process a compound of the general formula

where $R_1$ and $R_2$ have the meaning set forth above, and is condensed with 2-thio-5-thiazolone to a compound of the general formula

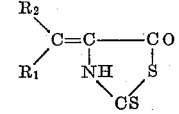

where $R_1$ and $R_2$ have the meaning set forth above, which last mentioned is then reduced in a hot acid medium using an acid reducing agent.

10. Process as set forth in claim 9 in which the condensation is effected in the presence of an acidic substance.

11. Process as set forth in claim 9 in which the condensation is effected in the presence of a basic substance.

12. Process as set forth in claim 1 in which the process is carried out at a temperature at which refluxing takes place.

References Cited in the file of this patent

UNITED STATES PATENTS

| Number | Name | Date |
|---|---|---|
| 2,255,903 | Shonle | Sept. 16, 1941 |
| 2,480,644 | Goldsmith et al. | Aug. 30, 1949 |

OTHER REFERENCES

Cook et al.: J. Chem. Society (London), February 1948, pp. 201–6.

Adams et al.: Organic Reactions, vol. 3 (1946), pp. 218–20.